US007620258B2

(12) United States Patent
Chen et al.

(10) Patent No.: US 7,620,258 B2
(45) Date of Patent: Nov. 17, 2009

(54) EXTENDED AMPLITUDE CODING FOR CLUSTERED TRANSFORM COEFFICIENTS

(75) Inventors: Wen-hsiung Chen, Sunnyvale, CA (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 744 days.

(21) Appl. No.: 11/270,138

(22) Filed: Nov. 9, 2005

(65) Prior Publication Data

US 2006/0056720 A1 Mar. 16, 2006

Related U.S. Application Data

(63) Continuation-in-part of application No. 11/069,622, filed on Feb. 28, 2005, which is a continuation-in-part of application No. 10/922,508, filed on Aug. 18, 2004, now Pat. No. 7,471,840.

(51) Int. Cl.
*G06K 9/36* (2006.01)

(52) U.S. Cl. .................................................. 382/245

(58) Field of Classification Search .................. 382/245
See application file for complete search history.

(56) References Cited

U.S. PATENT DOCUMENTS

| | | | | |
|---|---|---|---|---|
| 4,698,672 | A | 10/1987 | Chen et al. | 358/136 |
| 4,706,265 | A | 11/1987 | Furukawa | 375/122 |
| 4,813,056 | A | 3/1989 | Fedele | 375/27 |
| 4,845,560 | A | 7/1989 | Kondo et al. | 358/133 |
| 4,858,017 | A | 8/1989 | Torbey | 358/426 |
| 4,920,426 | A | 4/1990 | Hatori et al. | 358/433 |
| 4,922,510 | A | 5/1990 | Brusewitz | 375/122 |
| 4,937,573 | A | 6/1990 | Silvio et al. | 341/67 |
| 4,985,700 | A | 1/1991 | Mikami | 341/59 |
| 4,985,766 | A | 1/1991 | Morrison et al. | 358/133 |
| 5,006,930 | A | 4/1991 | Stroppiana et al. | 358/133 |
| 5,045,938 | A | 9/1991 | Sugiyama | 358/133 |
| 5,062,152 | A | 10/1991 | Faulkner | 359/185 |
| 5,086,488 | A | 2/1992 | Kato et al. | 382/56 |
| 5,128,758 | A | 7/1992 | Azadegan et al. | 358/133 |

(Continued)

FOREIGN PATENT DOCUMENTS

| | | |
|---|---|---|
| EP | 0 266 049 A2 | 5/1988 |
| WO | WO 93/18616 | 9/1993 |
| WO | WO 03/090421 | 10/2003 |

OTHER PUBLICATIONS

G. Cote, B. Erol, M. Gallant, & F. Kossentini, "H.263+: Video Coding as Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek

(57) ABSTRACT

Coding quantized transform coefficients as occur in image compression combines a position coding method to code the position of clusters of consecutive non-zero-valued coefficients with an amplitude coding method to code the amplitudes of a concatenation of a plurality of the clusters. The amplitude coding method exploits that runs of amplitude 1 coefficients are more likely in the clusters than runs of other coefficient amplitudes.

37 Claims, 6 Drawing Sheets start block
100
101 Provide breakpoint defining 1st and 2nd region (if 2nd exists)
103 1st region: identify runs of zero-valued coeffs., and clusters of non-zero-valued coeffs.
105 1st region: encode positions of clusters of non-zeroes, and runs of zeroes
107 1st region: encode the emplitudes of concat. of clusters of non-zero-valued coeffs. and encode each sign.
109 2nd region (if one exists): define events of runs of zero-valued coeffs followed by single non-zero-valued coeff, dominated by amplitude 1; mark exceptions to ampl. 1
111 2nd region (if there is one): encode runlengths; encode sign; encode amplitude of exceptions
end block

U.S. PATENT DOCUMENTS

| | | | | |
|---|---|---|---|---|
| 5,136,376 | A | 8/1992 | Yagasaki et al. | 358/133 |
| 5,162,795 | A | 11/1992 | Shirota | 341/67 |
| 5,166,684 | A | 11/1992 | Juri et al. | 341/67 |
| 5,179,442 | A | 1/1993 | Azadegan et al. | 358/133 |
| 5,226,082 | A | 7/1993 | Kustka | 380/46 |
| 5,253,053 | A | 10/1993 | Chu et al. | 358/133 |
| 5,253,055 | A | 10/1993 | Civanlar et al. | 358/133 |
| 5,291,282 | A | 3/1994 | Nakagawa et al. | 348/384 |
| 5,298,991 | A | 3/1994 | Yagasaki et al. | 348/416 |
| 5,301,032 | A | 4/1994 | Hong et al. | 358/261.2 |
| 5,307,163 | A | 4/1994 | Hatano et al. | 348/415 |
| 5,319,457 | A | 6/1994 | Nakahashi et al. | 348/387 |
| 5,337,087 | A | 8/1994 | Mishima | 348/405 |
| 5,363,097 | A | 11/1994 | Jan | 341/67 |
| 5,371,811 | A | 12/1994 | Morrison et al. | 382/56 |
| 5,400,075 | A | 3/1995 | Savatier | 348/384 |
| 5,402,244 | A | 3/1995 | Kim | 358/261.2 |
| 5,446,744 | A | 8/1995 | Nagasawa et al. | 371/37.4 |
| RE35,093 | E | 11/1995 | Wang et al. | 348/413 |
| 5,475,501 | A | 12/1995 | Yagasaki | 358/426 |
| 5,479,527 | A | 12/1995 | Chen | 382/232 |
| 5,488,367 | A | 1/1996 | Kitamura | 341/106 |
| 5,488,418 | A | 1/1996 | Mishima et al. | 348/398 |
| 5,488,616 | A | 1/1996 | Takishima et al. | 371/30 |
| 5,491,480 | A | 2/1996 | Jan et al. | 341/67 |
| 5,528,628 | A | 6/1996 | Park et al. | 375/240 |
| 5,539,401 | A | 7/1996 | Kumaki et al. | 341/67 |
| 5,642,115 | A | 6/1997 | Chen | 341/67 |
| 5,644,305 | A | 7/1997 | Inoue et al. | 341/67 |
| 5,648,774 | A | 7/1997 | Hsieh | 341/67 |
| 5,650,782 | A | 7/1997 | Kim | 341/67 |
| 5,696,558 | A | 12/1997 | Tsukamoto | 348/405 |
| 5,717,394 | A | 2/1998 | Schwartz et al. | 341/51 |
| 5,731,836 | A | 3/1998 | Lee | 348/402 |
| 5,740,283 | A | 4/1998 | Meeker | 382/248 |
| 5,751,232 | A | 5/1998 | Inoue et al. | 341/63 |
| 5,767,800 | A | 6/1998 | Machida et al. | 341/67 |
| 5,767,908 | A | 6/1998 | Choi | 348/403 |
| 5,774,594 | A | 6/1998 | Kitamura | 382/239 |
| 5,793,432 | A | 8/1998 | Mishima et al. | 348/423 |
| 5,793,897 | A | 8/1998 | Jo et al. | 382/246 |
| 5,818,877 | A | 10/1998 | Tsai et al. | 375/241 |
| 5,822,463 | A | 10/1998 | Yokose et al. | 382/251 |
| 5,832,130 | A | 11/1998 | Kim | 382/248 |
| 5,844,611 | A | 12/1998 | Hamano et al. | 348/403 |
| 5,852,469 | A | 12/1998 | Nagai et al. | 348/384 |
| 5,883,589 | A | 3/1999 | Takishima et al. | 341/67 |
| 5,923,813 | A | 7/1999 | Okamoto et al. | 386/109 |
| 5,956,153 | A | 9/1999 | Hirabayashi | 358/433 |
| 5,982,437 | A | 11/1999 | Okazaki et al. | 348/413 |
| 5,999,111 | A | 12/1999 | Park et al. | 341/67 |
| 6,014,095 | A | 1/2000 | Yokoyama | 341/67 |
| 6,104,754 | A | 8/2000 | Chujoh et al. | 375/240 |
| 6,111,914 | A | 8/2000 | Bist | 375/240 |
| 6,118,822 | A | 9/2000 | Bist | 375/240 |
| 6,140,944 | A | 10/2000 | Toyoyama | 341/63 |
| 6,144,322 | A | 11/2000 | Sato | 341/67 |
| 6,198,848 | B1 | 3/2001 | Honma et al. | 382/232 |
| 6,218,968 | B1 | 4/2001 | Smeets et al. | 341/65 |
| 6,229,460 | B1 | 5/2001 | Tsai et al. | 341/67 |
| 6,256,064 | B1 | 7/2001 | Chujoh et al. | 348/240.23 |
| 6,278,801 | B1 | 8/2001 | Boon | 382/246 |
| 6,304,607 | B1 | 10/2001 | Talluri et al. | 375/240.27 |
| 6,339,386 | B1 | 1/2002 | Cho | 341/67 |
| 6,388,588 | B2 | 5/2002 | Kitamura | 341/67 |
| 6,404,929 | B1 | 6/2002 | Boon | 382/233 |
| 6,408,029 | B1 | 6/2002 | McVeigh et al. | 375/240.13 |
| 6,445,314 | B1 | 9/2002 | Zhang et al. | 341/67 |
| 6,445,739 | B1 | 9/2002 | Shen et al. | 375/240.03 |
| 6,477,280 | B1 | 11/2002 | Malvar | 382/245 |
| 6,771,828 | B1 | 8/2004 | Malvar | 382/240 |
| 2004/0228540 | A1 | 11/2004 | Chen et al. | 382/246 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M.Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97_193.pdf, Retrieved Dec. 16, 2002.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/, Retrieved Dec. 18, 2002.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

PCT International Preliminary Report on Patentability on PCT application PCT/US2006/060472.

Table 8: Codes for events of runs of zeroes and non-zeroes follwed by a zero

| Length of preceding zeroes | Length of non-zero-value cluster | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | C(0,1) | C(0,2) | C(0,3) | C(0,4) | C(0,5) | C(0,6) | C(0,7) | C(0,8) | C(0,9) | C(0,10) | C(0,11) | **C(0,12)** |
| 1 | C(1,1) | C(1,2) | C(1,3) | C(1,4) | C(1,5) | C(1,6) | C(1,7) | C(1,8) | C(1,9) | C(1,10) | **C(1,11)** | |
| 2 | C(2,1) | C(2,2) | C(2,3) | C(2,4) | C(2,5) | C(2,6) | C(2,7) | C(2,8) | C(2,9) | **C(2,10)** | | |
| 3 | C(3,1) | C(3,2) | C(3,3) | C(3,4) | C(3,5) | C(3,6) | C(3,7) | C(3,8) | **C(3,9)** | | | |
| 4 | C(4,1) | C(4,2) | C(4,3) | C(4,4) | C(4,5) | C(4,6) | C(4,7) | **C(4,8)** | | | | |
| 5 | C(5,1) | C(5,2) | C(5,3) | C(5,4) | C(5,5) | C(5,6) | **C(5,7)** | | | | | |
| 6 | C(6,1) | C(6,2) | C(6,3) | C(6,4) | C(6,5) | **C(6,6)** | | | | | | |
| 7 | C(7,1) | C(7,2) | C(7,3) | C(7,4) | **C(7,5)** | | | | | | | |
| 8 | C(8,1) | C(8,2) | C(8,3) | **C(8,4)** | | | | | | | | |
| 9 | C(9,1) | C(9,2) | **C(9,3)** | | | | | | | | | |
| 10 | C(10,1) | **C(10,2)** | | | | | | | | | | |
| 11 | **C(11,1)** | | | | | | | | | | | |
| 12 | **C(12,0)** | | | | | | | | | | | |

FIG. 2

EXTENDED AMPLITUDE CODING FOR CLUSTERED TRANSFORM COEFFICIENTS

RELATED PATENT APPLICATIONS

The present invention is a continuation-in-part and claims benefit of priority of the following U.S. patent application:

U.S. patent application Ser. No. 11/069,622, filed 28 Feb. 2005, now U.S. Pat. No. 7,499,596 to inventors Chen, et al., and titled "AMPLITUDE CODING FOR CLUSTERED TRANSFORM COEFFICIENTS". The methods disclosed therein are referred to collectively and individually as the "Multi-Table Amplitude VLC Method" herein.

U.S. patent application Ser. No. 11/069,622, now U.S. Pat. No. 7,499,596 is a continuation-in-part of U.S. patent application Ser. No. 10/922,508, filed 18 Aug. 2004, now U.S. Pat. No. 7,471,840 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION". The aspects introduced herein that are also disclosed therein are referred to collectively and individually as the "2-D Non-Zero/Zero Cluster VLC Method" herein.

The contents of U.S. patent application Ser. Nos. 11/069,622, now U.S. Pat. No. 7,499,596 and 10/922,508, now U.S. Pat. No. 7,471,840 are incorporated herein by reference, except for any material incorporated by reference in the above referenced patent applications or patents and not explicitly incorporated by reference in the present disclosure.

The present invention is related to the following commonly assigned U.S. patent applications:

U.S. patent application Ser. No. 10/869,229, filed 15 Jun. 2004, now U.S. Pat. No. 7,454,076 to inventors Chen, et al., and titled "A HYBRID VARIABLE LENGTH CODING METHOD FOR LOW BIT RATE VIDEO CODING". The aspects introduced herein that are also disclosed therein are referred to collectively and individually herein as the "Basic Hybrid VLC Method" herein.

U.S. patent application Ser. No. 10/898,654, filed 22 Jul. 2004, now U.S. Pat. No. 7,483,584 to inventors Chen, et al., and titled "AN EXTENDED HYBRID VARIABLE LENGTH CODING METHOD FOR LOW BIT RATE VIDEO CODING". The aspects introduced herein that are also disclosed therein are referred to collectively and individually as the "Extended Hybrid VLC Method" herein.

U.S. patent application Ser. No. 10/910,712, filed 3 Aug. 2004, now U.S. Pat. No. 7,454,073 to inventors Chen, et al., and titled "VIDEO COMPRESSION USING MULTIPLE VARIABLE LENGTH CODING PROCESSES FOR MULTIPLE CLASSES OF TRANSFORM COEFFICIENT BLOCKS". The aspects introduced herein that are also disclosed therein are referred to collectively and individually as the "Multiple-Class VLC Method" herein.

U.S. patent application Ser. No. 10/922,507, filed 18 Aug. 2004, now U.S. Pat. No. 7,492,956 to inventors Chen, et al., and, titled "VIDEO CODING USING MULTI-DIMENSIONAL AMPLITUDE CODING AND 2-D NON-ZERO/ZERO CLUSTER POSITION CODING". The aspects introduced herein that are also disclosed therein are referred to collectively and individually as the "Basic Multi-Dimensional Amplitude VLC Method" herein.

U.S. patent application Ser. No. 11/069,621, filed 28 Feb. 2005, now U.S. Pat. No. 7,499,595 to inventors Chen, et al., and titled "JOINT AMPLITUDE AND POSITION CODING FOR PHOTOGRAPHIC IMAGE AND VIDEO CODING". The aspects introduced herein that are also disclosed therein are referred to collectively and individually as the "Joint Position and Amplitude VLC Method" herein.

U.S. patent application Ser. No. 11/069,620, filed 28 Feb. 2005, now U.S. Pat. No. 7,471,841 to inventors Wu, et al., and titled "ADAPTIVE BREAKPOINT FOR HYBRID VARIABLE LENGTH CODING". The aspects introduced herein that are also disclosed therein are referred to collectively and individually as the "Adaptive Breakpoint Method" herein.

The contents of each of the above related Patent Applications and issued patents therefrom are incorporated herein by reference for all purposes, except for any material incorporated by reference in such patents, and patent applications and not explicitly incorporated by reference in the present disclosure.

BACKGROUND

Two-dimensional variable length coding (2D-VLC) includes collecting or assuming the statistics of two dimensional block transform coefficient events that are each a run of the most likely-to-occur amplitude, e.g., 0, followed by another amplitude. The coding includes assigning variable length codes, e.g., optimal codes such as Huffman codes or Arithmetic codes, to each event. In the description herein, 0 is assumed to be the most likely-to-occur amplitude. The collecting of or assuming statistics includes tracking the quantized non-zero-valued coefficient amplitudes and the number of zero-valued coefficients preceding the non-zero amplitude, i.e., tracking the runlengths of zeros which precedes any non-zero amplitude along a specified path, e.g., a zigzag scan path for a block of coefficients, e.g., an 8 by 8 or a 16 by 16 coefficient block. Table 1 below shows by example the statistics tabulated as a two dimensional table:

TABLE 1

2D-VLC statistics

| | | Runlength of preceding 0's | | | | | | | |
|---|---|---|---|---|---|---|---|---|---|
| | | 0 | 1 | 2 | 3 | 4 | 5 | 6 | . . . . . . |
| Coeff. Amp. | 1 | S10 | S11 | S12 | S13 | S14 | S15 | S16 | . . . . . . |
| | 2 | S20 | S21 | S22 | S23 | S24 | S25 | S26 | . . . . . . |
| | 3 | S30 | S31 | S32 | S33 | S34 | S35 | S36 | . . . . . . |
| | 4 | S40 | S41 | S42 | S43 | S44 | S45 | S46 | . . . . . . |
| | 5 | S50 | S51 | S52 | S53 | S54 | S55 | S56 | . . . . . . |
| | 6 | S60 | S61 | S62 | S63 | S64 | S65 | S66 | . . . . . . |
| | 7 | S70 | S71 | S72 | S73 | S74 | S75 | S76 | . . . . . . |
| | 8 | S80 | S81 | S82 | S83 | S84 | S85 | S86 | . . . . . . |
| | 9 | S90 | S91 | S92 | S93 | S94 | S95 | S96 | . . . . . . |
| | . . . | . . . | . . . | . . . | . . . | . . . | . . . | . . . | . . . . . . |
| | . . . | . . . | . . . | . . . | . . . | . . . | . . . | . . . | . . . . . . |
| | . . . | . . . | . . . | . . . | . . . | . . . | . . . | . . . | . . . . . . |

In the table, Sij is the likelihood expressed, for example, as a relative number of occurrences of an amplitude of i, i=1, 2, . . . occurring after a run of j 0's, j=0, 1, 2, . . .

A variable length code such as an optimal code is then assigned to each of the events that have an Sij above, with the most likely-to-occur element—typically S10 for the case of encoding a block of transform coefficients in transform coding—having the shortest number of bits, and the least occurring event coded using the longest number of bits. Table 2 below shows an example of a 2D-VLC table:

TABLE 2

| | | 2D-VLC codes | | | | | | | |
|---|---|---|---|---|---|---|---|---|---|
| | | Runlength of preceding 0's | | | | | | | |
| | | 0 | 1 | 2 | 3 | 4 | 5 | 6 | . . . . . . |
| Coeff. Amp. | 1 | C10 | C11 | C12 | C13 | C14 | C15 | C16 | . . . . . . |
| | 2 | C20 | C21 | C22 | C23 | C24 | C25 | C26 | . . . . . . |
| | 3 | C30 | C31 | C32 | C33 | C34 | C35 | C36 | . . . . . . |
| | 4 | C40 | C41 | C42 | C43 | C44 | C45 | C46 | . . . . . . |
| | 5 | C50 | C51 | C52 | C53 | C54 | C55 | C56 | . . . . . . |
| | 6 | C60 | C61 | C62 | C63 | C64 | C65 | C66 | . . . . . . |
| | 7 | C70 | C71 | C72 | C73 | C74 | C75 | C76 | . . . . . . |
| | 8 | C80 | C81 | C82 | C83 | C84 | C85 | C86 | . . . . . . |
| | 9 | C90 | C91 | C92 | C93 | C94 | C95 | C96 | . . . . . . |
| | . . . | . . . | . . . | . . . | . . . | . . . | . . . | . . . | . . . . . . |
| | . . . | . . . | . . . | . . . | . . . | . . . | . . . | . . . | . . . . . . |
| | . . . | . . . | . . . | . . . | . . . | . . . | . . . | . . . | . . . . . . |

where Cij is the codeword used to encode the event of the combination of j consecutive 0-valued coefficients followed by a single non-zero coefficient of amplitude i, j=0,1, . . . and i=1, 2, . . .

2D-VLC is used in common transform coding methods such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Typically, interframe and intraframe images have different 2D-VLC tables. The DC component is typically separately encoded. Furthermore, the 2D-VLC table may be truncated so that the least frequently occurring events use an escape code followed by a fixed length code. A special "EOB" code is used to indicate the end of a block when all remaining coefficients are zero.

Still images are similarly encoded, e.g., in the same manner as an intraframe image for motion video.

A table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. An escape code together with a fixed length code is used for relatively less likely-to-occur combinations.

The advantage of 2D-VLC is that both the position of each non-zero-valued coefficient as indicated by the runlength, and the quantized amplitude value are coded simultaneously as a pair using one 2D-VLC table. This may result in shorter codes, i.e., codes that use fewer bits than using separate VLC tables for each non-zero-valued coefficient and for its amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero coefficient in the block, RUN, the run-length of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero coefficient is the last one is incorporated into the event. A table lookup may be used to implement 3D-VLC.

One deficiency of 2D-VLC is that every non-zero-valued coefficient needs to be accompanied by a runlength code to identify its position, in the form of the number of preceding zero-valued coefficients.

In block based transform coding, the inventors have observed that there often is a region, e.g., a low frequency region along the ordering in which non-zero-valued coefficients tend to cluster, i.e., there are often a number of consecutive non-zero-valued coefficients along the low frequency region of the pre-determined path. This may especially occur in intraframe coding and high bit rate interframe coding. Each one of a number of such consecutive non-zero-valued coefficients would require the same number of codewords representing the position and amplitude. That is, 2D-VLC requires a separate runlength code, e.g., C10, C20, C30 . . . , etc., for each of the consecutive non-zero coefficients.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes a method called the "Extended 2D-VLC Method" herein that includes encoding repetitions of some non-zero coefficient values. One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in a practical implementation, only a limited number of the most likely-to-occur non-zero amplitude values, such as 1 and 2, and a limited number of lengths of consecutive non-zero-values, such as 3 or 4 consecutive values, are regrouped for pattern matching.

Furthermore, in coding, while there may be a region where there are clusters of non-zero-valued coefficients, there is also likely to be a high frequency region where any non-zero-valued coefficients are likely to be scattered.

With these observation in mind, the Basic Hybrid VLC Method of above-mentioned incorporated by reference U.S. patent application Ser. No. 10/869,229, now U.S. Pat. No. 7,454,076 to inventors Chen et al. was developed to encode the position and amplitude of quantized transform coefficients separately and takes advantage of the nature of the distribution of the transform coefficients in the low frequency and high frequency regions.

The Extended Hybrid VLC Method of incorporated by reference U.S. patent application Ser. No. 10/898,654, now U.S. Pat. No. 7,483,584 provides an alternative coding method for the high frequency region by taking advantage of the very few amplitude values in the high frequency region, especially, for example, for low bit rate and interframe applications.

In one embodiment of the above-mentioned Basic Hybrid VLC Method, two independent types of coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of either no consecutive zero-valued coefficients or runs of one or more consecutive zero-valued coefficients using a run-length coding method of a third type. The encoding further includes coding the amplitude values and sign of the non-zero-valued coefficients.

In one embodiment of the above-mentioned Extended Hybrid VLC Method, a coding method is used in the second region that takes into account that almost all non-zero-valued coefficients in the high frequency region are ±1. No amplitude coding is needed to encode runs of consecutive zeroes that end in a coefficient of amplitude 1. An exception (escape) code is included to encode those rare non-zero-valued coefficients that have values other than ±1.

In the Basic Hybrid VLC Method and the Extended Hybrid VLC Method, the consecutive non-zero-valued coefficients and the consecutive zero-valued coefficients in the low frequency region are coded alternatively using two independent one-dimensional variable length coding methods, e.g., using two independent one-dimensional VLC tables. An observation was made that an improvement in coding efficiency can further be achieved by pairing the consecutive non-zero-valued coefficients and zero-valued coefficients as a pair and applying a single two-dimensional table to code the pair. With this observation, the 2-D Non-Zero/Zero Cluster Coding Method of above-mentioned incorporated by reference U.S. patent application Ser. No. 10/922,508, now U.S. Pat. No. 7,471,840 was introduced to improve the coding efficiency, for example for the low frequency region, and in other embodiments for more than the low frequency region.

In one embodiment of the 2-D Non-Zero/Zero Cluster Coding Method, a method includes, in a first contiguous region, identifying events that each include a run of zero-valued coefficients preceding a run of one or more non-zero-valued coefficients. The method includes for each such event, jointly encoding the runlengths of the preceding run of zero-valued coefficients and the following run of non-zero-valued coefficients with a codeword, such that for at least some events, relatively more likely-to-occur pairs of runlengths are encoded by a shorter codeword than relatively less likely-to-occur runlengths. The method further includes encoding each amplitude in the run of consecutive non-zero-valued coefficients, and encoding the signs of such coefficients. In an improved variation, each event includes a single zero-valued coefficient following the run of non-zero-valued coefficients.

In each of the 2-D Non-Zero/Zero Cluster Coding Method, the Basic Hybrid VLC Method, and the Extended Hybrid VLC Method, various variable length coding methods are introduced to encode the relative positions of the clustered or non-clustered transform coefficients. After each such encoding, a coding of the magnitude of each non-zero valued coefficient is included, as is a sign bit (+ or −).

The inventors have noticed that encoding the amplitudes takes up a significant part of the code in VLC coding of clusters of non-zero-valued coefficients. With this in mind, the inventors observed that, at least in theory, an improvement in amplitude code can be achieved by introducing a single multi-dimensional code, say an n-dimensional code, n an integer greater than 1, to encode n clustered non-zero coefficients, instead of using n separate one dimensional codes. The Basic Multi-Dimensional Amplitude Coding Method of above-mentioned incorporated-by-reference U.S. patent application Ser. No. 10/922,507, now U.S. Pat. No. 7,492,956 includes such multidimensional amplitude coding.

One embodiment of the Basic Multi-Dimensional Amplitude Coding Method includes, in a first region, identifying events that each includes a run of one or more non-zero-valued coefficients, and for each such event, encoding the event with a codeword such that for at least some events, relatively more likely-to-occur events are encoded by a shorter codeword than relatively less likely-to-occur events, and for each identified event, jointly encoding a plurality of consecutive values in the run of consecutive non-zero-valued coefficients, the joint encoding according to an amplitude coding method. The method is such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

While the Basic Multi-Dimensional Amplitude Coding Method invention described in U.S. patent application Ser. No. 10/922,507, now U.S. Pat. No. 7,492,956 appears to improve the overall coding efficiency, it was observed that the size of the n-dimensional table used for the joint encoding can become rather large for a large "n." As a result, in practice, the size of n has to be limited to a low number of consecutive non-zero-amplitude values, such as 1, 2 and 3 for practical implementation.

With this in mind, the Multi-Table Amplitude Coding Method of above-mentioned incorporated by reference U.S. patent application Ser. No. 11/069,622, now U.S. Pat. No. 7,499,596 was introduced. Rather than using a single multi-dimensional coding table for a cluster of a number—say n—consecutive non-zero-valued coefficients, events are identified within the cluster that each include a run of consecutive amplitude-1 coefficients, followed by a single coefficient of amplitude greater than 1. Included are events of only a single coefficient of amplitude greater than 1 and runs of only amplitude 1. For each event, a codeword is assigned to the runlength of the preceding run of amplitude-1 coefficients combined with the amplitude of the ending coefficient. A two-dimensional coding table is used for each cluster length n, so that the multidimensional table of the Basic Multi-Dimensional Amplitude Coding Method is replaced by a number of increasingly large 2-D coding tables. The value of n can be as large as the position of the breakpoint. One view of the Multi-Table Amplitude Coding Method is that it applies a modified 2D-VLC method within each cluster of consecutive non-zero-valued coefficients, with the most likely to occur amplitude in the cluster being 1, so that, within each cluster, one can view the method as applying a 2D-VLC method to a modified sequence of coefficients, with each coefficient amplitude reduced by 1, and with appropriate assumed or measured statistics for such clusters.

To further improve the coding efficiency, the position code and amplitude code can be jointly coded. One aspect of the Joint Position and Amplitude VLC Method" of above-mentioned U.S. patent application Ser. No. 11/069,621, now U.S. Pat. No. 7,499,595 is jointly encoding the relative position and runlength of each clusters of non-zero valued coefficients with the amplitudes of the non-zero-coefficients in the cluster to form a joint codeword for the combination of the relative position of the cluster and of the non-zero amplitudes within the cluster. In particular, one aspect of the present invention is that rather than concatenating the codes for the position of clusters with the codes for the amplitudes of the non-zero coefficients in the clusters, a function of the position on the one hand, and non-zero amplitudes on the other hand, is used to obtain a single codeword for the position and non-zero-coefficient amplitudes of the cluster. In one embodiment, the signs of the non-zero amplitudes are included such that the function is also of the signs of the non-zero amplitudes.

To further improve the coding efficiency, the position code and amplitude code can be jointly coded. One aspect of the Joint position and Amplitude VLC Method" of above-mentioned U.S. patent application Ser. No. 11/069,621 is jointly encoding the relative position and runlength of each clusters of non-zero valued coefficients with the amplitudes of the non-zero-coefficients in the cluster to form a joint codeword for the combination of the relative position of the cluster and off the non-zero amplitudes within the cluster. In particular, one aspect of the present invention is that rather than concatenating the codes for the position of clusters with the codes for the amplitudes of the non-zero coefficients in the clusters, a function of the position on the one hand, and non-zero amplitudes on the other hand, is used to obtain a single codeword for the position and non-zero-coefficient amplitudes of the cluster. In one embodiment, the signs of the non-zero amplitudes are included such that the function is also of the signs of the non-zero amplitudes.

As an example, the two-dimensional position code and the multi-dimensional amplitude code, e.g., n-dimensional amplitude code, were n is an integer greater than 1 may be jointly coded as a (2+n)-dimensional code in the low frequency region, while a one-dimensional position code and one-dimensional amplitude code are jointly coded as 2-dimensional code, such as the conventional 2D-VLC, in the high frequency region. While it is relatively easy to construct a 2D-VLC code table for the high frequency coefficients, a construction of (2+n) dimensional code table for the low frequency coefficients simply becomes too large to be manageable.

In order to reduce the size of the code table to a manageable size in the joint position and amplitude coding, the size of n needs to be restricted to a low number. With this restriction, those clustered coefficients with a large n can always be resorted back to a separate position and amplitude coding.

There is always a need to improve the coding efficiency of variable length coding of quantized transform coefficients that occur in transform image compression. While each of the techniques described above provides a potential improvement, the inventors have found that there is still room for improvement.

SUMMARY

Described herein are a method, a carrier medium carrying computer readable codes such as a computer program, the code to instruct a processor to execute the method, and an apparatus applicable for coding a series quantized transform coefficients as occur in image compression. An aspect of the present invention combines a position coding method to code the position of clusters of consecutive non-zero-valued coefficients with an amplitude coding method to code the amplitudes of a concatenation of a plurality of the clusters of non-zero-valued coefficients. The amplitude coding method exploits that runs of amplitude 1 coefficients are more likely in the clusters than runs of other coefficient amplitudes.

The method is applicable for coding an ordered series of quantized coefficients of a transform of image data in a first region—e.g., the low frequency region—of the series. Such a series occurs in many image compression methods. One aspect of the invention includes jointly encoding two or more clusters by amplitude coding the (longer) cluster that results from the concatenation of the two or more clusters. Encoding such longer cluster(s) can provide improved coding when using a code for the cluster that more efficiently encodes longer clusters than shorter clusters. The code for the positioning indicates the relative position of each cluster of non-zero-valued coefficients.

One embodiment is a method for processing an ordered series of digital signals that each have an amplitude from a finite set of amplitudes consisting of the most likely-to-occur amplitude and at least one other amplitude, the at least one other amplitude including a next most likely-to-occur amplitude to the most likely-to-occur amplitude. The processing is to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords.

The method includes, for a first contiguous region in the series, which in one version is the whole series, identifying position events that each include a cluster of at least one consecutive signal having any amplitude other than the most likely-to-occur amplitude, such that the position events define the relative positions and runlengths of the clusters and of any intervening runs of consecutive coefficients having the most likely-to-occur value. The method further includes encoding the position events. The method further includes encoding the amplitudes of the consecutive coefficients in one or more concatenations of a plurality of consecutive clusters to form at least one codeword for each concatenation. The encoding of amplitudes includes using a first amplitude coding method that exploits that runs of consecutive signals having the next most likely-to-occur amplitude are more likely to occur in clusters than are runs of other signal amplitudes, such that for at least some of the concatenations, relatively more likely-to-occur series of consecutive signal amplitudes are encoded by a shorter codeword than relatively less likely-to-occur series of consecutive signal amplitudes. The method is configured such that relatively short codewords are formed to represent signal values or sequences of signal values that are relatively more likely-to-occur, and relatively long codewords are formed to represent signal values or sequences of signal values that are relatively less likely-to-occur.

In several embodiments, the series of digital signals is a series of quantized coefficients of a transformed block of image data, the transform such that the most likely-to-occur amplitude is 0, and the next most likely-to-occur amplitude is 1, such that the identifying of position events identifies events that include a cluster one or more non-zero-valued coefficients, and such that the concatenations are of a plurality of consecutive clusters of non-zero-valued coefficients.

Other aspects, features, advantages, and details are described in the description herein, and in the claims

BRIEF DESCRIPTION OF THE DRAWINGS

FIG. 2 shows a code table for the positions of zeroes and clusters of non-zero coefficients using an embodiment of the 2-D Non-Zero/Zero Cluster Coding Method used in one embodiment of the invention.

DETAILED DESCRIPTION

Described herein are a method, a carrier medium storing computer readable code (a program) to cause a processor to execute the method, and an apparatus applicable for coding quantized transform coefficients as occur in image compression. An aspect of the present invention includes a first coding method used to code the position of consecutive non-zero-valued coefficients that occur in runs of non-zero-valued coefficients ("clusters"), and a second coding method used to code the amplitudes of the non-zero-valued coefficients in the clusters to produce codewords for coding an ordered series of quantized coefficients of a transform of image data in a first region—the low frequency region—of the series. Such a series occurs in many image compression methods. One aspect of the invention includes jointly encoding two or more clusters by amplitude coding the (longer) cluster that results from the concatenation of the two or more clusters. Encoding such longer cluster(s) can provide improved coding when using a code for the cluster that more efficiently encodes longer clusters than shorter clusters. The code for the positioning indicates the relative position of each cluster of non-zero-valued coefficients. Another aspect of the invention is the joint coding using the first coding method in combination with the second coding method to produce a combined code.

While the description is written in terms of an ordered series of digital values that are quantized transform coefficients of a block of image data, with zero-valued quantized coefficients being the most likely-to-occur, and quantized coefficients of value±1 being the next most likely-to-occur values, the invention is, in general, applicable to an ordered series of digital signals that each have an amplitude from a finite set of amplitudes consisting of the most likely-to-occur amplitude and at least one other amplitude.

Figure 1:
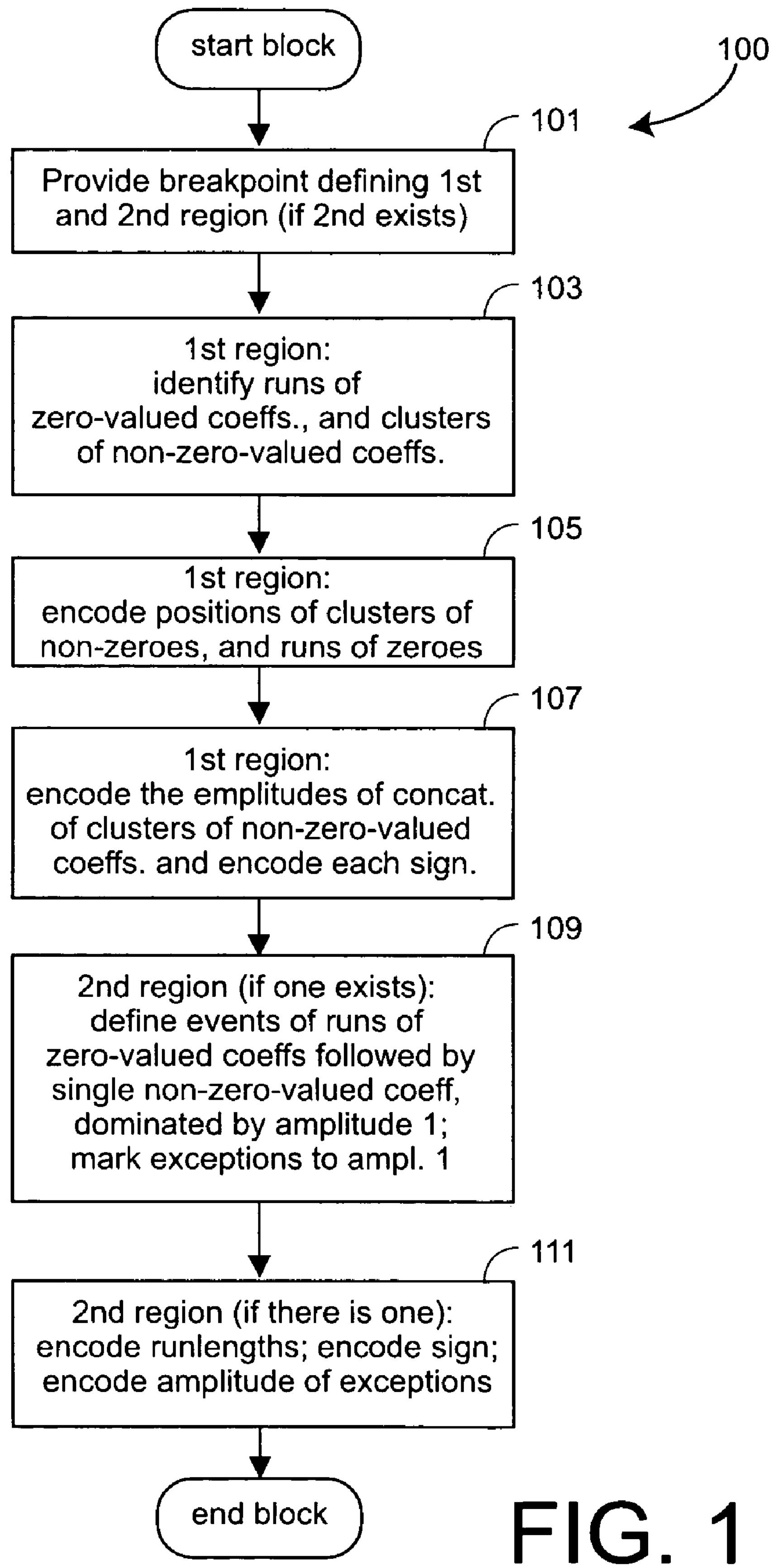
FIG. 1 shows a flow chart of one embodiment of a hybrid variable length coding (VLC) method that includes in a first region coding the positions and length of clusters of non-zero coefficients and of zero-valued coefficients, and further that includes coding the amplitudes of the coefficients in a concatenation of the clusters of non-zero-valued coefficients.

FIG. 1 shows a flow chart of one embodiment of a variable length coding (VLC) method 100 that includes in 101 providing a breakpoint along the ordering of the series to define a first, e.g., low frequency region wherein non-zero-coefficients are likely to be clustered, and a second, e.g., high-frequency region where non-zero coefficients are likely to be scattered, and in the version shown, likely to be dominated by amplitude-1 coefficients. In the case of a non-hybrid method, there is no second region, i.e., the first region covers all the coefficients, typically excluding the non-DC coefficients.

In 103, each run of consecutive zero-valued coefficients, and each run of consecutive non-zero-valued coefficients (called "clusters") is identified. Different encoding methods are available for encoding the positions of the zero and non-zero-valued coefficients. The Basic Hybrid Method and the Extended Hybrid Method provide separate codewords for the runlengths of the zero-value coefficients, and for the runlengths of the clusters of non-zero-valued coefficients. The codes include variable length codes determined using assumed or actual statistics. Thus, step 103 identifies the runlengths of the consecutive zero-valued coefficients and of the non-zero-valued coefficients. The 2-D Non-Zero/Zero Cluster Coding Method on the other hand forms a codeword for the joint coding of the runlengths of consecutive zero-valued coefficients that precedes a run of one or more non-zero-valued coefficients that is followed by a single zero-valued coefficient. Thus, in the case that the first region coding uses an embodiment of the 2-D Non-Zero/Zero Cluster Coding Method, step 103 includes identifying the runlengths of consecutive zero-values coefficients and of the cluster of non-zero-valued coefficients that follows the zeroes, including a single zero-valued coefficient following the run of non-zero-valued coefficients. Furthermore, events that have no non-zero-valued coefficients preceding the non-zero coefficient(s) are included.

In 105, the identified events are encoded. In the embodiment using the 2-D Non-Zero/Zero Cluster Coding Method, the encoding uses joint encoding for each event of the runlength of the preceding zero-valued coefficient and the runlength of the following one or more non-zero-valued coefficients. In one embodiment using the 2-D Non-Zero/Zero Cluster Coding Method, 105 includes using a two-dimensional lookup table of codes. The codes include variable length codes determined using assumed or actual statistics.

In 107, the amplitudes in each run of non-zero-amplitudes in the identified event is encoded using an amplitude code. One aspect of the present invention includes coding modified clusters that are each a concatenation of two or more adjacent clusters, so that a coding method that efficiently encodes longer clusters can be used. The inventors recognized that runs of non-zero-valued coefficients of amplitude 1 are more likely than any other methods, so that a coding method that efficiently encodes runs of amplitude-1 coefficients in a cluster is likely to lead to coding efficiency improvement. A first amplitude method that takes advantage of the existence of such runs is used to encode the non-zero-amplitudes in the concatenations. In one embodiment, the first amplitude method is the amplitude coding method of the Multi-Table Amplitude VLC Method and is used in 107 to code the amplitudes of the concatenated clusters. This method exploits that runs of amplitude-1 coefficients occur relatively frequently in clusters of non-zero valued coefficients coding gains and applies a modified 2D-VLC method within each cluster of consecutive non-zero-valued coefficients, with the most likely to occur amplitude in the cluster being 1, so that, within each cluster, one can view the method as applying a 2D-VLC method to a modified sequence of coefficients, with each coefficient amplitude reduced by 1, and with appropriate assumed or measured statistics for such clusters.

In one embodiment, the first amplitude coding method is applied to pairs of consecutive clusters that have been concatenated. In an alternate embodiment, amplitude coding is applied to the cluster that results from concatenating three consecutive clusters. In other alternate embodiments, amplitude coding is applied to the cluster that results from concatenating different numbers of more than three consecutive clusters. Denote by $N_c$, $N_c>1$, the integer number of consecutive clusters of non-zero-valued coefficients that are concatenated to form the cluster that is amplitude coded, so that different values of $N_c$ correspond to different alternative embodiments. In each of these, the first or the last concatenated cluster to be encoded may have less than $N_c$ consecutive clusters. Because the position code for the runs of zero-valued coefficients, and for the clusters provides accurate locations of the component clusters, the last coding being applied to the concatenation of less than $N_c$ consecutive clusters does not present a problem for a decoder.

Since a non-zero cluster is often dominated by the quantized coefficient amplitude of 1, there is a high probability that the first and last coefficients are of amplitude 1. In another embodiment, the first amplitude coding method is applied only to concatenations of clusters that have an amplitude of 1 at each side of each concatenation boundary, e.g., to a concatenation of a cluster that ends in an amplitude 1 immediately followed by a cluster that starts with an amplitude-1 coefficient.

In the case of using the Multi-Table Amplitude VLC Method, multiple 2D-amplitude tables with the table length equal to the length of the concatenated clusters are desirable. However, in an alternate embodiment, the number of tables can be reduced to simplify the implementation. The inventors have found that this does not overly sacrifice the performance.

To further simplify the implementation, in one embodiment, the amplitude coding is applied to a concatenation of all the clusters within the first, e.g., low-frequency region, or to the whole sequence of coefficients in the case that the whole sequence is being encoded.

As an example, referring to the flowchart of FIG. 1, suppose in 103, events that are each a pair of "z" consecutive zero-valued coefficients and "n" consecutive non-zero-valued coefficients, followed by a single zero-value, are identified, and suppose further that in 105, the events are coded using the coding invention described in the 2-D Non-Zero/Zero Cluster Coding Method. Denote by R(z,n) the event of z preceding zero-valued coefficients/following n non-zero valued coefficients and denote each of the non-zero amplitudes in the cluster contained in R(z,n) by m(1), m(2), . . . , m(n). Further, denote by S(1), S(2), . . . , S(n) the sign bits for the first, second, . . . , n'th non-zero-valued coefficient in R(z,n). For the encoding of 105 using the 2-D Non-Zero/Zero Cluster Coding Method, denote by C(z,n) the variable length codeword for the event R(z,n), z=0,1, . . . , n=1, 2, . . .

As an alternate embodiment, in 103 and 105, the method described in the Basic Hybrid Coding Method and the Extended Hybrid Coding Method is used for the position encoding. Denote by r(n) an identified run of n consecutive non-zero coefficients, and r'(z) an identified run of z consecutive zero-valued coefficients in the first region, n,z=1,2, . . . Consider a single event denoted by r(n), denote each of the non-zero amplitudes in r(n) by m(1), m(2), . . . , m(n). Denote by C(n) the variable length codeword for the run length of non-zero-valued coefficients in the event r(n), n=1, 2, . . . and C'(z) the variable length codeword for the run length of zero-valued coefficients in the event r'(z), z=1, 2, . . . Therefore, rather than a single codeword C(z,n) describing each cluster preceded by none or more zero-valued coefficients followed by a single zero-valued coefficient, two codewords C(n) and C'(z) are used to describe a slightly different event: one or more zero-valued coefficient followed by a cluster of n non-zeroed valued coefficients. In an improvement to the method of the Basic and Extended Hybrid Methods, the event r(n) identified is of n non-zero valued coefficients followed by a single zero-valued coefficient. In such a situation, the codeword C(z,n) is replaced by the codewords C(n) and C'(z), each representing the same event.

Suppose in step 107, a number $N_c$ clusters are concatenated. In one embodiment, $N_c$ is pre-defined, and in another, $N_c$ is determined by the sequence of coefficients, e.g., in an embodiment wherein the code for a concatenation of all clusters is obtained. When using the 2-D Non-Zero/Zero Cluster Coding Method, denote by $C(z_1,n_1)$, $C(z_2,n_2)$, . . . $C(z_{Nc},n_{Nc})$ the codewords for the positions of the first, second, . . . $N_c$'th event, where $n_1$, $n_2$, . . . , $n_{Nc}$ are the lengths of the first, second, . . . , $N_c$'th clusters of non-zero coefficients, and $z_1$, $z_2$, . . . , $z_{Nc}$ are the numbers of zero-valued coefficients preceding the first, second, . . . , $N_c$'th clusters, respectively. When using the position code of the Basic Hybrid Coding Method or the Extended Hybrid Coding Method, denote by $C(n_1)$, $C(n_2)$, . . . $C(n_{Nc})$ the variable length codeword for first, second, . . . , $N_c$'th cluster, respectively, and denote by $C'(z_1)$, $C'(z_2)$, . . . $C'(z_{Nc})$ the variable length codeword for lengths of zero-valued coefficients preceding the first, second, . . . , $N_c$'th cluster, respectively.

For the amplitude coding of 107, denote by $m_1(\mathbf{1})$, $m_1(\mathbf{2})$, . . . , $m_1(n_1)$, $m_2(\mathbf{1})$, $m_2(\mathbf{2})$, . . . , $m_2(n_2)$, . . . , $m_{Nc}(\mathbf{1})$, $m_{Nc}(\mathbf{2})$, . . . , $m_{Nc}(n_{Nc})$ the magnitudes of the Nc clusters in a concatenation, where $n_1$, $n_2$, . . . , $n_{Nc}$ are the lengths of the first, second, . . . , $N_c$'th cluster, respectively, with $n_1$, $n_2$, . . . , $n_{Nc}=1, 2, \ldots$, and where $m_k(\cdot)$ is the magnitude in the k'th cluster in the concatenation, k=1, . . . , $N_c$. In addition, denote by $S_1(\mathbf{1})$, $S_1(\mathbf{2})$, . . . , $S_1(n_1)$, $S_2(\mathbf{1})$, $S_2(\mathbf{2})$, . . . , $S_2(n_2)$, . . . , $S_{Nc}(\mathbf{1})$, $S_{Nc}(\mathbf{2})$, . . . , $S_{Nc}(n_{Nc})$ the signs of the $N_c$ clusters in a concatenation, where $S_k(\cdot)$ is the sign in the k'th cluster in the concatenation. Furthermore, denote by $n_c=n_1+n_2+\ldots+n_{Nc}$ the number of non-zero coefficients in the cluster.

One embodiment of step 107 uses an aspect of the Basic Multi-Dimensional Amplitude Coding Method. One such aspect is to use a single codeword obtained by a multidimensional amplitude encoding method to encode the sequence of amplitudes of the concatenation of the clusters by a variable length codeword. The codeword can be obtained by a multi-dimensional coding table, obtained using assumed or measured statistics. For example, denote by $A_{n_c}(m_1(\mathbf{1}), m_1(\mathbf{2}), \ldots, m_{Nc}(n_{Nc}))$ the codeword for the sequence of $n_c$ quantized amplitudes in the concatenation. According to one embodiment of the Basic Multi-Dimensional Amplitude Coding Method, in the case the encoding of 107 is of the concatenation of all the clusters, using the Basic Multi-Dimensional Amplitude Coding Method leads to the code for the first region (which could be the whole region) of:

$$C(z_1,n_1)+C(z_2,n_2)+\ldots+C(z_{Nc},n_{Nc})+ A_{n_c}(m_1(1), m_1(2), \ldots, m_{Nc}(n_{Nc}))+ S_1(1)+S_1(2)+\ldots+S_{Nc}(n_{Nc}),$$

where + denotes concatenation, and in one embodiment when using the Basic Hybrid Coding Method or the Extended Hybrid Coding Method with the Basic Multi-Dimensional Amplitude Coding Method, the code is:

$C(n_1)+C'(z_1)+C(n_2)+C'(z_2), \ldots C(n_{Nc})+$
$C'(z_{Nc}) A_{n_c}(m_1(1), m_1(2), \ldots, m_{Nc}(n_{Nc}))+$
$S_1(1)+S_1(2)+ \ldots +S_{Nc}(n_{Nc})$.

In order to make the size of the multi-dimensional tables manageable from a practical implementation point of view, the maximum length of the run of non-zero amplitudes jointly encoded using the Basic Multi-Dimensional Amplitude Coding Method is restricted to relatively low numbers such as 2 or 3 in a practical implementation. Only a few concatenated clusters would have such a short length.

One embodiment of step 107 uses an aspect of the Multi-Table Amplitude Coding Method that uses an observation that in clusters of non-zero-valued coefficients, the appearance of amplitude 1 is more likely than that of amplitude 2, the appearance of amplitude 2 is more likely than that of amplitude 3, and so forth. In one embodiment of the Multi-Table Amplitude Coding Method, within each concatenation of $N_c$ clusters, such a concatenation containing $n_c$ non-zero valued coefficients, events are recognized of consecutive amplitude-1 coefficients followed by single coefficient of amplitude greater than one. Such events include the runlength of 0 amplitide-1 coefficients followed by the single coefficient of amplitude greater than 1. Denote by j, j=0, 1, 2, . . . ,n−1 the length of the amplitude 1 coefficients, and denote by k, k=2, 3, . . . ,M the amplitude of the ending coefficient. It also is possible to have all 1's in the concatenation of clusters. One embodiment of the Multi-Table Amplitude Coding Method includes assigning a variable length code for each identified event of the combination of the runlength of 1's and the amplitude of the final coefficient, or for an exception of all 1's. The variable length code may be assigned using assumed or measured statistics. A 2-D code table may be built to assign the codes. There is a different code table for each cluster length n. Denote by $K_{n_c}(j,k)$ the variable length codeword. Suppose there are p such events in a concatenation of clusters of length $n_c$. Denote by $n_{events}$ the number of such events in a cluster of length m, and $j_i$ and $k_i$ the runlength of preceding amplitude-1 coefficients, and the value of the final coefficient, respectively, in the ith event, i=1, 2, . . . , $n_{events}$, $j_i$=0, 1, . . . , and $k_i$=2, 3, . . . Further denote by $S_i(\mathbf{1}), S_i(\mathbf{2}), \ldots, S_i(j_i+1)$ the sign code of the non-zero coefficients in the ith event. Then, using an embodiment of the 2-D Non-Zero/Zero Cluster Coding Method together with an embodiment of the Multi-Table Amplitude Coding Method, and denoting concatenation over the values of i by $\Sigma_i$, the codewords for the first region are:

$$C(z_1, n_1) + C(z_2, n_2) + \ldots + C_c(z_{Nc}, n_{Nc}) + + \sum_i \{C_{n_c}(j_i, k_i) + S_i(1) + \ldots + S_i(j_i + 1)\}.$$

Furthermore, using the Basic Hybrid Coding Method or the Extended Hybrid Coding Method with the Multi-Table Amplitude Coding Method, the codewords are:

$$C(n_1) + C'(z_1) + C(n_2) + C'(z_2), \ldots C(n_{Nc}) + C'(z_{Nc}) + \sum_i \{C_{n_c}(j_i, k_i) + S_i(1) + \ldots + S_i(j_i + 1)\}.$$

Note that the inventors have noted that for short clusters, e.g., n=2 or 3, the Basic Multi-Dimensional Amplitude Coding Method works well, while for longer clusters, e.g., n>3, the Multi-Table Amplitude Coding Method is preferred. Thus, one embodiment uses both the Basic Multi-Dimensional Amplitude Coding Method and the Multi-Table Amplitude Coding Method depending on the length of the cluster of non-zero-valued coefficients.

For example, in the case that the Basic Multi-Dimensional Amplitude Coding Method is used for concatenations of clusters of total lengths $n_c \leqq 3$, and the Multi-Table Amplitude Coding Method is used for concatenations of clusters of total lengths $n_c>3$, and the 2-D Non-Zero/Zero Cluster Coding Method is used for encoding the relative positions of the clusters, then the code for the clusters and positions, in the case $N_c$ includes all the clusters, may be expressed as $$\begin{aligned}
&\text{If } n \leq 3 \text{ then}\\
&C(z_1, n_1) + C(z_2, n_2) + \ldots + C(z_{Nc}, n_{Nc}) + \\
&\qquad A_{n_c}(m_1(1), m_1(2), \ldots, m_{Nc}(n_{Nc})) + S_1(1) + S_1(2) + \ldots + S_{Nc}(n_{Nc}),\\
&\text{else if } n > 3 \text{ then}\\
&C(z_1, n_1) + C(z_2, n_2) + \ldots + C(z_{Nc}, n_{Nc}) + \\
&\qquad \sum_i \{C_{n_c}(j_i, k_i) + S_i(1) + \ldots + S_i(j_i + 1)\} \cdot C(z, n) + \\
&\qquad\qquad \sum_i \{C_n(j_i, k_i) + S_i(1) + \ldots + S_i(j_i + 1)\}.
\end{aligned}$$

Moving onto 109, in the version shown in FIG. 1, the second, e.g., high frequency region is encoded as described in the Extended Hybrid Coding method. Thus, in 109, events are defined that are each either no consecutive zero-valued coefficients, or a run of one or more zero-valued coefficients followed by a single non-zero-valued coefficient. Any such non-zero coefficient is assumed to have amplitude 1 such that no amplitude encoding is required for such a coefficient. A non-amplitude-1, non-zero coefficient is marked as an exception. Furthermore, the remainder of the block being zero is also identified. In 111, for each identified event in the second region, the runlength of the zero-valued coefficients preceding the single non-zero-valued coefficient is encoded using a variable length runlength coding method, implemented, e.g., as a coding table. The sign of the ending non-zero-value coefficient is encoded by a sign bit, and, in the case that the non-zero-valued coefficient is the exceptional case of not having amplitude 1, an exception code followed by an amplitude code is included. The amplitude code is obtained, e.g., using an amplitude coding table, which in general is different than the amplitude coding table used for encoding the non-zero-amplitudes in the first region, since the second region amplitudes are more likely to have lower value than the first region amplitudes.

How to set up the codeword tables includes either assuming or obtaining statistics for typical series of coefficient image blocks, or, in an adaptive system, by measurement of the relative frequencies of occurrence of events and amplitudes, depending on the coding method, e.g., code table.

Figure 3:
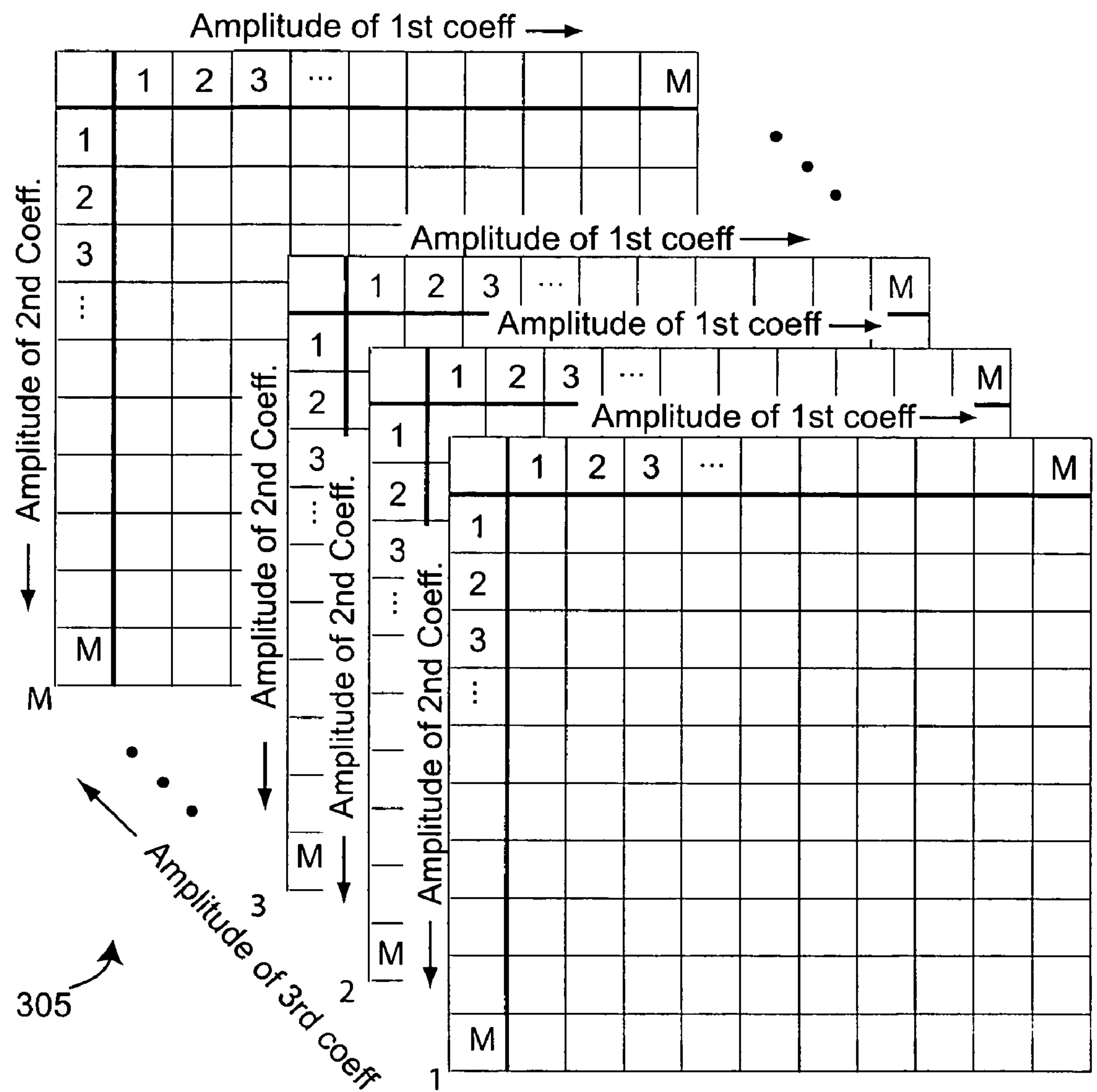
FIG. 3 shows a 3-D code table for the amplitudes of clusters of three consecutive non-zero coefficients for using the Basic Multi-Dimensional Amplitude Coding Method in one embodiment of the invention.
Figure 4:
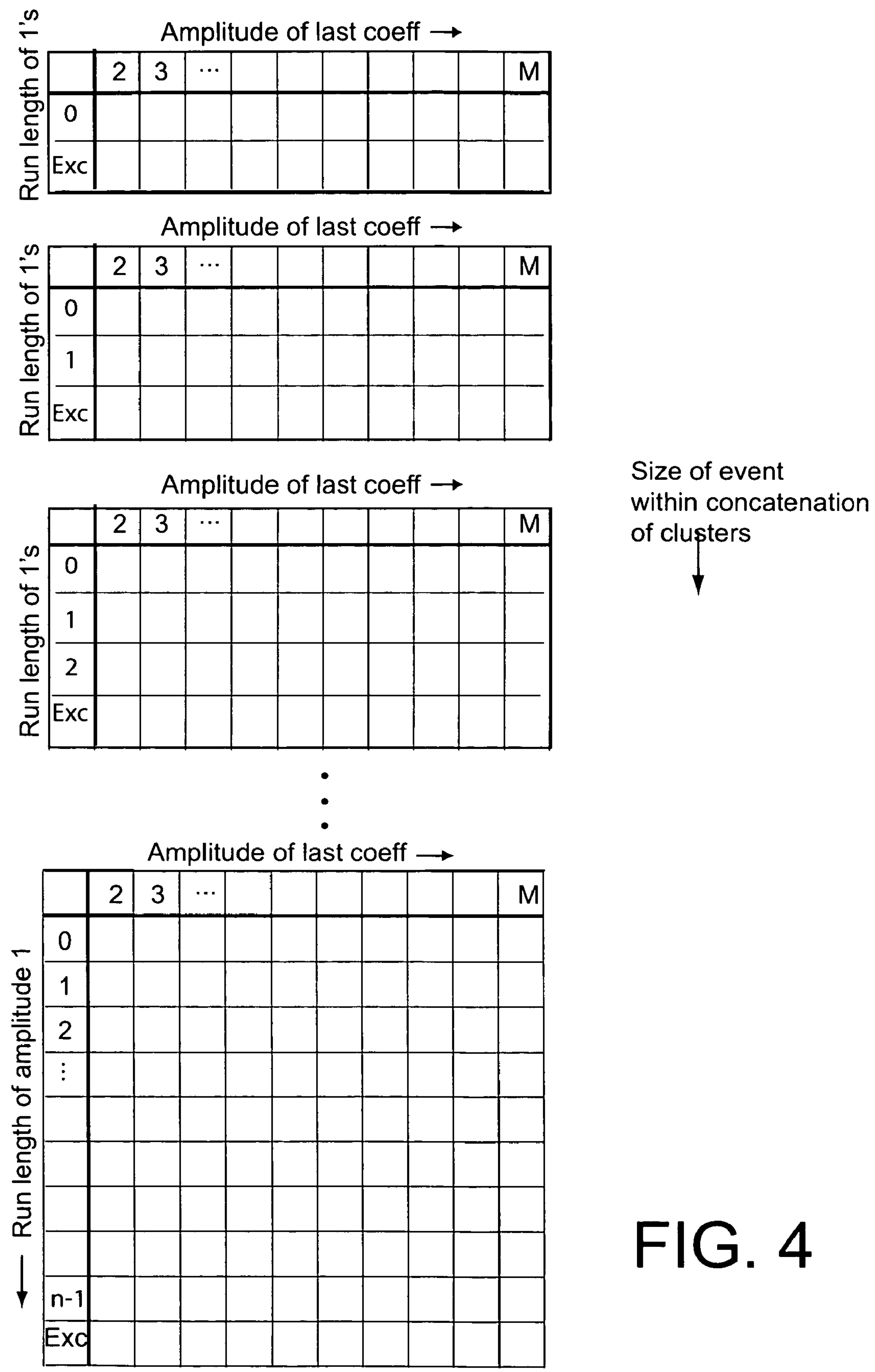
FIG. 4 shows a set of 2-D code tables for the events within a cluster of n non-zero coefficients, each event being a runlength of preceding amplitude 1 coefficients for the runlength=0, 1, . . . , n−1, followed by the final amplitude larger than 1, for using the Multi-Table Amplitude Coding Method in one embodiment of the invention.

FIG. 2 shows a code table for the positions of zeroes and clusters of non-zero coefficients using an embodiment of the 2-D Non-Zero/Zero Cluster Coding Method. FIG. 3 shows a 3-D code table 305 for the amplitudes up to value M of clusters of three consecutive non-zero coefficients. FIG. 4 shows a set of 2-D code tables for the events within a cluster of n non-zero coefficients, each event being a runlength of preceding amplitude 1 coefficients for the runlength=0, 1, . . . , n−1, followed by the final amplitude larger than 1. Since the runs of the non-zero values can be all amplitude 1, such events, called exceptions, have been denoted as "Exc"

and the codeword for such events denoted by $C_n$(Exc). Note that there are n such tables of the events, depending on the runlength of the cluster of non-zero amplitude coefficients.

EXAMPLE

Coding using aspects of the present invention are now described as an example, and compared to encoding according to conventional 2D-VLC, the Basic Hybrid VLC Method, the 2-D Non-Zero/Zero Cluster Coding Method with conventional amplitude coding, the 2-D Non-Zero/Zero Cluster Coding Method with the Multi-Dimensional Amplitude Coding Method, and the 2-D Non-Zero/Zero Cluster Coding Method with the Multi-Table Amplitude Coding Method.

Suppose a sequence of quantized transform coefficients in the low frequency region is as follows, excluding the DC coefficient, and assuming a breakpoint N=18:

3-1 1 1-2 1 1 0 0-1 2 1 1-1 0 0 0 1|0, where | represents the breakpoint.

As a review of some of the above described methods, Coding using the 2-D Non-Zero/Zero Cluster Coding Method with separate amplitude coding of the non-zero-valued coefficients in the first (low-frequency) region includes identifying events of a run of zero-valued coefficients preceding a run (cluster) of non-zero coefficients followed by a single zero-valued coefficient. Using | to separate such events, the low frequency region consists of, assuming a soft boundary:

|3-1 1 1-2 1 1 0|0-1 2 1 1-1 0|0 0 1 0|.

The code is:

$$|C(0,7)+(A(3)+S_+)+(A(1)+S_-)+(A(1)+S_+)+(A(1)+S_+)+(A(2)+S_-)+(A(1)+S_+)+(A(1)+S_+)|+|C(1,5)+(A(1)+S_-)+(A(2)+S_+)+(A(1)+S_+)+(A(1)+S_+)+(A(1)+S_-)|+|C(2,1)+(A(1)+S_+)|$$

where C(z,n) represents position code for 2D non-zero/zero clusters, where z is the number of zero-valued coefficients preceding a cluster of non-zero-valued coefficients followed by a single zero-values coefficient, and where n is the number of non-zero-valued coefficients in the cluster. A(i) is the one-dimensional amplitude code for a non-zero amplitude of i, while $S_+$ and $S_-$ represents codes used to encode positive and negative signs, respectively.

Coding using the the 2-D Non-Zero/Zero Cluster Coding Method with the Multi-Dimensional Amplitude Coding Method to code the position and amplitudes of clusters non-zero-valued coefficients in the first (low-frequency) region includes identifying events of a run of zero-valued coefficients preceding a run (cluster) of non-zero coefficients followed by a single zero-valued coefficient. Using | to separate such events, the low frequency region consists of, assuming a soft boundary, the sequence can be written as:

|3-1 1 1-2 1 1 0|0-1 2 1 1-1 0|0 0 1 0.

The code is:

$$|C(0,7)+A_7(3,1,1,1,2,1,1)+S_++S_-+S_++S_++S_-+S_++S_+)|+|C(1,5)+A_5(1,2,1,1,1)+S_-+S_++S_++S_++S_-)|+|C(2,1)+A_1(1)+S_+)|$$

where $A_n$(.) are n-dimensional functions of the amplitudes of the n-consecutive non-zero amplitudes in a cluster. Note that in practice, it is unlikely that the seven-dimensional codes $A_7$ would be used, and such a code is presented here for illustrative purposes only.

Coding using the the 2-D Non-Zero/Zero Cluster Coding Method and the Multi-Table Amplitude Coding Method to code the positions and amplitudes of clusters of non-zero-valued coefficients in the first (low-frequency) region identifying runs of zero-valued coefficients preceding runs (cluster) of non-zero coefficients followed by a single zero-valued coefficient, then within a cluster of n consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the low frequency region consists of, assuming a soft boundary, the region is:

|3-1 1 1-2 1 1 0|0-1 2 1 1-1 0|0 0 1 0|.

The code is:

$$|C(0,7)+C_7(0,3)+S_++C_7(3,2)+S_-+S_++S_++S_-+C_7(Exc)+S_++S_+)|+|C(1,5)+C_5(1,2)+S_-+S_++C_5(Exc)+S_++S_++S_-|+|C(2,1)+C_1(Exc)+S_+)|$$

where by $C_n$(j,k) denotes the variable length codeword within a cluster of n non-zero-valued coefficients for a run of j amplitude-1 coefficients preceding a coefficient of value k>1, and $C_n$(Esc) denotes codeword within a cluster of n non-zero-valued coefficients for a run of only amplitude-1 coefficients that is not followed by a coefficient of amplitude greater than 1.

Coding using the the concatenation aspect of the present invention together with the 2-D Non-Zero/Zero Cluster Coding Method and the Multi-Table Amplitude Coding Method to code the positions and amplitudes of the concatenated clusters of non-zero-valued coefficients in the first (low-frequency) region includes identifying runs of zero-valued coefficients preceding runs (cluster) of non-zero coefficients followed by a single zero-valued coefficient, then within the concatenation of all clusters, leading to a cluster of $n_c$ consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the low frequency region consists of, assuming a soft boundary:

|3-1 1 1-2 1 1 0|0-1 2 1 1-1 0|0 0 1 0| so that there are three clusters (non-pre-defined $N_c$=3). The position codes for the three clusters of non-zero-valued coefficient clusters are (leaving out the indications of the codes of each cluster):

C(0,7), C(1,5), and C(2,1).

The concatenated non-zero-valued clusters in the first region for the following cluster of $n_c$=13 non-zero-values:

|3-1 1 1 1-2 1 1-1 2 1 1-1 1|0

The code is:

$$|C(0,7)+C(1,5)+C(2,1)+[C_{13}(0,3)+S_+]+[C_{13}(3,2)+S_-+S_++S_++S_-]+[C_{13}(3,2)+S_++S_++S_-+S_+]+[C_{13}(Exc)+S_++S_++S_-+S_+]|+\ldots$$

where again $C_n$(j,k) denotes the variable length codeword within a concatenated cluster of n non-zero-valued coefficients for a run of j amplitude-1 coefficients preceding a coefficient of value k>1, and $C_n$(Esc) denotes codeword within a concatenated cluster of n non-zero-valued coefficients for a run of only amplitude-1 coefficients that is not followed by a coefficient of amplitude greater than 1.

As can be seen, there are indeed fewer codewords with the concatenation aspect of the present invention when combined with the multi-table coding method.

Apparatus

Figure 5:
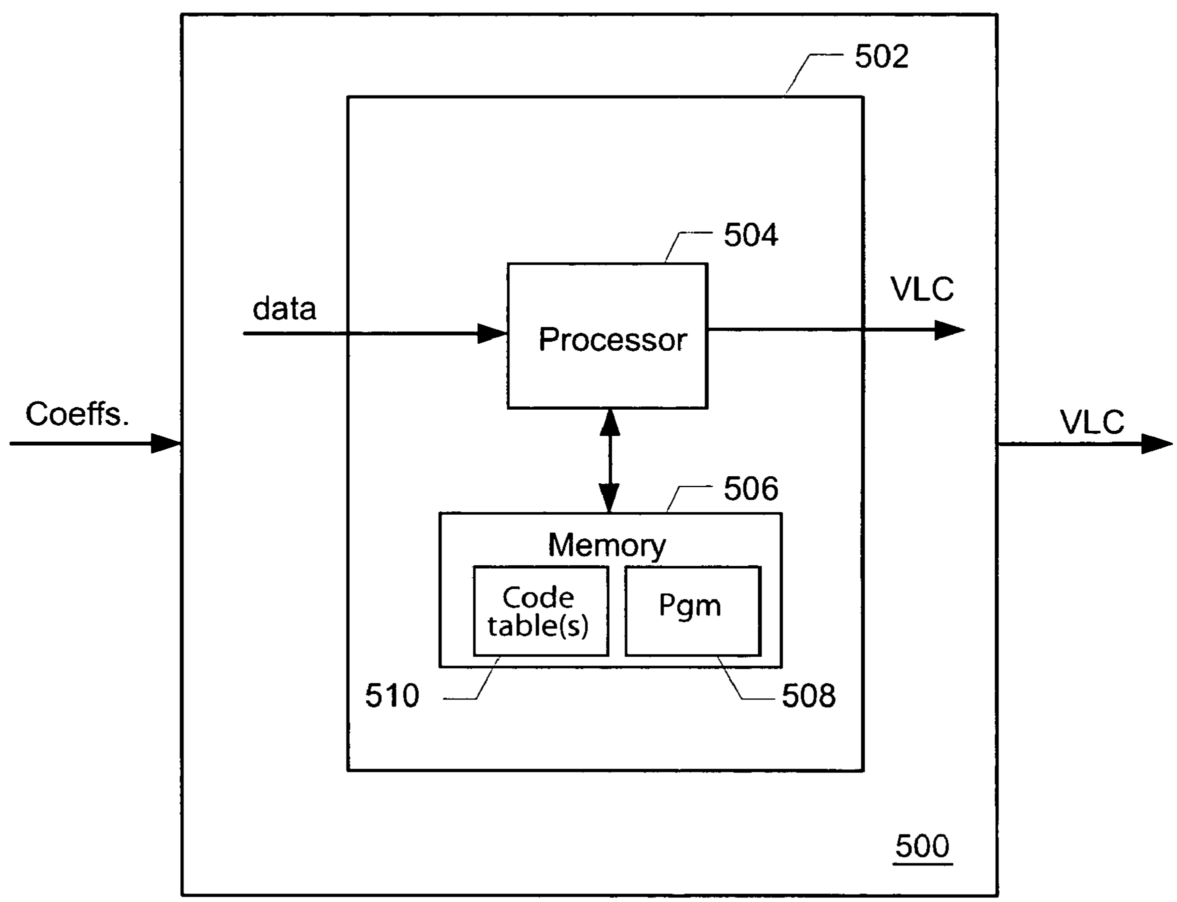
FIG. 5 shows an apparatus for coding a series of digital signals, e.g., an ordered series of quantized coefficients of a transformed block of image data, including a processing system that has a memory containing code that implements an embodiment of the coding method described herein.

Another aspect of the invention is an apparatus for coding a series of digital signals, e.g., an ordered series of quantized coefficients of a transformed block of image data. FIG. 5 shows an apparatus 500 that includes a processing system 502 that includes one or more processors 504 and a memory 506. A single processor is shown in FIG. 5 and those in the art will appreciate that this may represent several processors. Similarly, a single memory subsystem 506 is shown, and those in the art will appreciate that the memory subsystem may include different elements such as RAM, ROM, and so forth. In addition, the memory subsystem is meant to include any non-volatile memory storage such as a magnetic or optical storage component. A computer program 508 is included and is loaded into the memory 506. Note that at any time, some of the program may be in different parts of the memory subsystem, as will be understood by those in the art. The program 508 includes instructions to instruct the processor to implement, in different versions, the different coding methods described above. The processor thus accepts as data the ordered coefficients and generates the codewords. The apparatus 500 further includes in the memory subsystem 506 a coding data structure 510 that provides the codewords for sets of one or more coefficients as described in any one of the novel coding methods described herein. In one embodiment, the data structure is in the form of the coding tables for the position codes and for the amplitude codes, and for the joint coding function of position code and amplitude code.

Note that FIG. 5 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 506 in FIG. 5) that stores a coding data structure that provides the codewords for sets of one or more coefficients as described in any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

Another aspect of the invention is a method to decode a bitstream in order to form a series of quantized coefficients of a transform of a block of image data, the transform such that 0 is the most likely coefficient amplitude and 1 is the next most likely coefficient amplitude. The bitstream is encoded by the coding method described above including, for a first contiguous region in the series, identifying clusters of at least one non-zero-valued coefficients, and for each such cluster, identifying at least one position event to identify the relative position and runlength of the cluster of non-zero coefficients, and identifying at least one amplitude event to define the non-zero amplitudes in the cluster of non-zero coefficients. The method further includes coding the identified position event(s), and further coding the amplitudes in one or more concatenations of the identified amplitude event(s) such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

The decoding method includes recognizing one or more position codewords, determining the positions of clusters of non-zero-valued coefficients from the position codewords, recognizing one or more amplitude codewords, determining the amplitudes and signs of the non-zero-coefficients in the concatenations represented by the recognized amplitude codewords; and determining the sub-series of coefficients from recognized codewords until all coefficients in the series are determined.

Figure 6:
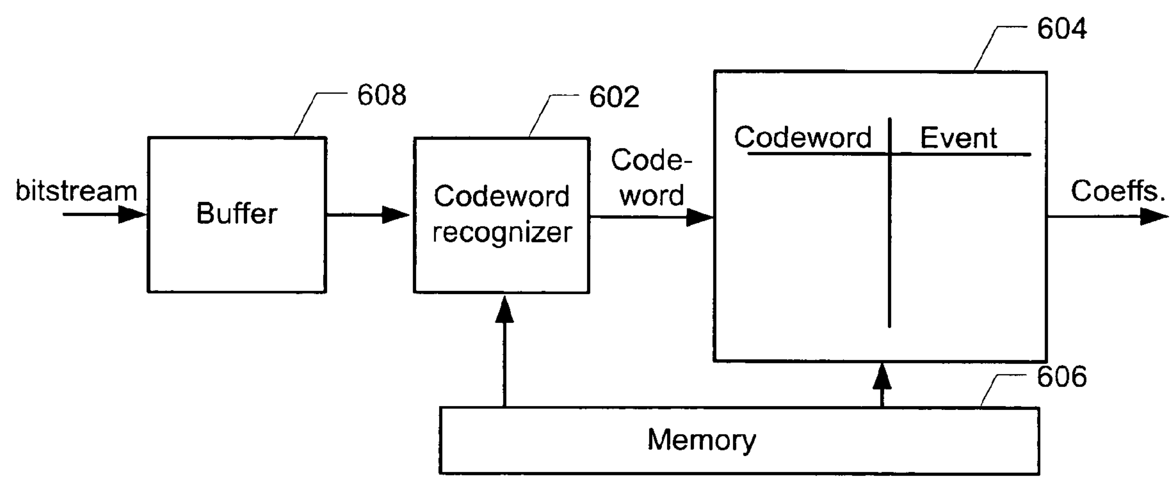
FIG. 6 shows an apparatus embodiment for decoding a bitstream representing series of codewords encoded according to one or more aspects of the present invention.

Another aspect of the invention is an apparatus for decoding a bitstream encoded by any of the methods described herein. FIG. 6 shows one embodiment of the apparatus. A codeword recognizer 602 accepts the bits of a bitstream and recognizes a codeword of a set of possible codewords. The codeword recognizer determines which of the a set of coding tables the codeword is from. A decoder 604 is coupled to the codeword recognizer 602 and determines the data for the codeword recognized by the codeword recognizer, e.g., the runlength of non-zeroes, the runlength of zeroes, the sign, etc. In one embodiment, the decoder 604 includes a lookup device that looks up the appropriate decoding table stored in a memory 606. That table provides the event that corresponds to at least some of the codewords of the set of codewords, e.g., the relative position in the case of a position codeword, or an amplitude event, or sign information. Other codewords may include an escape code, so that decoding is by other than a table lookup method. In one embodiment, the bitstream is stored in a buffer 608, and the output of the buffer is coupled to the codeword recognizer. The apparatus for decoding implements a codeword decoding method that includes recognizing one or more position codewords, determining the positions of clusters of non-zero-valued coefficients from the position codewords, recognizing one or more amplitude codewords, determining the amplitudes and signs of the non-zero-coefficients in the concatenations represented by the recognized amplitude codewords; and determining the sub-series of coefficients from recognized codewords until all coefficients in the series are determined.

While in the embodiment shown in FIG. 6, the memory is shown separate from the lookup device, those in the art will understand that in other embodiments, the lookup device includes memory for the tables, and such other embodiments are included herein.

Note further that in FIG. 6, the codeword recognizer and also the lookup device may be each implemented on a computer as a set of instructions stored in a memory, e.g., the memory 606, that instruct one or more processors to carry out the operations of the recognition and of the lookup.

Another aspect of the invention is a memory (such as memory 606 in FIG. 6) that stores a decoding data structure that provides the data for any set of codewords recognized in a bitstream of compressed image data. The bitstream is coded by any one of the novel coding methods described herein. In one embodiment, the data structure is in the form of one or more tables.

Note that in some embodiments, it is stated that coding of the amplitudes is applied to concatenations of a pre-defined number of consecutive clusters. It is to be understood that in some situations, there may only be fewer clusters than the pre-defined number remaining to be encoded in the first region, e.g., because there are fewer than the pre-defined number in the fist part, or because, after encoding concatenations of one or more sets of the pre-defined number of clusters, there are only less than the pre-defined number of clusters remaining in the first region.

The coding and decoding methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in a server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of an image encoder. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note also that the term amplitude is irrespective of sign. Therefore, for example, coefficient of values +1 and −1 both have amplitude 1.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Any U.S. patent publications, U.S. patents, and U.S patent applications cited herein are hereby incorporated by reference, except for any material incorporated by reference in such patent publications, patents, and patent applications and not explicitly incorporated by reference in the present disclosure.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noted that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of processing using hardware that includes one or more processing elements, the processing using the hardware being of an ordered series of digital signals that each has an amplitude from a finite set of amplitudes consisting of the most likely-to-occur amplitude and at least one other amplitude, the at least one other amplitude including a next most likely-to-occur amplitude to the most likely-to-occur amplitude, the processing using the hardware being in order to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords, the method comprising:

for a first contiguous region in the senes:

identifying position events that each include a cluster of at least one consecutive signal having any amplitude other than the most likely-to-occur amplitude, such that the position events define relative positions and runlengths of the clusters and of any intervening runs of consecutive coefficients having the most likely-to-occur value;

encoding the position events; and encoding the amplitudes of the consecutive coefficients in one or more concatenations of a plurality of consecutive clusters to form at least one codeword for each concatenation, the encoding of amplitudes including using a first amplitude coding method that exploits that runs of consecutive signals having the next most likely-to-occur amplitude are more likely to occur in clusters than are runs of other signal amplitudes, such that for at least some of the concatenations, relatively more likely-to-occur series of consecutive signal amplitudes are encoded by a shorter codeword than relatively less likely-to-occur series of consecutive signal amplitudes, such that relatively short codewords are formed to represent signal values or sequences of signal values that are relatively more likely-to-occur, and relatively long codewords are formed to represent signal values or sequences of signal values that are relatively less likely-to-occur.

2. A method as recited in claim 1, wherein the series of digital signals is a series of quantized coefficients of a transformed block of image data, formed by a transform such that the most likely-to-occur amplitude is 0, and the next most likely-to-occur amplitude is 1, such that the identifying of position events identifies events that include a cluster one or more non-zero-valued coefficients, and such that the concatenations are of a plurality of consecutive clusters of non-zero-valued coefficients.

3. A method as recited in claim 2, wherein the identifying of the position events is configured such that events that include all the clusters of non-zero coefficients in the series are identified, and wherein the encoding of amplitudes is applied to all the clusters of non-zero coefficients in the series.

4. A method as recited in claim 2, wherein the encoding of amplitudes using the first amplitude coding method is for those concatenations of clusters of non-zero coefficients in the series that have a total number of non-zero coefficients ("concatenation length") more than to a pre-selected length threshold, the method further comprising, for each concatenation that has a concatenation length less than or equal to the pre-selected length threshold:

jointly encoding the non-zero amplitudes of the concatenation by a multi-dimensional coding function of the amplitudes to produce a codeword such that for at least some runs of non-zero amplitudes, relatively more likely-to-occur amplitude runs are encoded by a shorter codeword than relatively less likely-to-occur amplitudes.

5. A method as recited in claim 2, wherein the transformed block of image data includes a DC term, and wherein the DC term is separately encoded, such that the series of digital signals is a set of non-DC quantized coefficients of a transformed block of image data.

6. A method as recited in claim 2, wherein the encoding of the amplitudes includes separately encoding the signs of the amplitudes.

7. A method as recited in claim 2, wherein the first amplitude coding method includes, for at least one concatenation:

recognizing one or more sequences in the concatenation that are each a run of at least one consecutive amplitude-1 coefficient that ends in a coefficient having an amplitude greater than 1, or in the case of a sequence at the end of a concatenation, that is a run of only consecutive amplitude-1 coefficients, each recognized sequence being defined by the length of the runlength of the consecutive amplitude-1 coefficients, and by the amplitude of the ending coefficient, and encoding each recognized sequence by a codeword, such that for at least some recognized sequences, relatively more likely-to-occur sequences are encoded by a codeword that is shorter codeword than that for relatively less likely-to-occur sequences.

8. A method as recited in claim 7, wherein the encoding of the amplitudes, uses an encoding table that provides a codeword for each pair of the runlength of the sequence of preceding amplitude-1 coefficients and the amplitude of the ending coefficient of amplitude greater than 1.

9. A method as recited in claim 8, wherein a different encoding table is used for each cluster length.

10. A method as recited in claim 8, wherein the coding table is constructed by assigning a variable length code according to measured or assumed statistics of pairs of the runlength of the sequence of preceding amplitude-1 coefficients and the amplitude of the ending coefficient.

11. A method as recited in claim 2, wherein the encoding of the amplitudes using the first amplitude coding method is applied only to concatenations of clusters that have an amplitude of 1 at each side of each concatenation boundary.

12. A method as recited in claim 2, wherein the encoding of the amplitudes using the first amplitude coding method is applied to concatenations of a pre-defined number of consecutive clusters, unless there are fewer clusters than the pre-defined number remaining to be encoded using the first amplitude coding method.

13. A method as recited in claim 2, wherein the encoding of the amplitudes using the first amplitude coding method is applied to concatenations of all the clusters in the first contiguous region.

14. A method as recited in claim 2, wherein the identifying of each position events includes identifying a run of consecutive zero-valued coefficients preceding a cluster of one or more consecutive non-zero-valued coefficients, or identifying that there are no zero-valued coefficients preceding a cluster of one or more consecutive non-zero-valued coefficients, such that each position event is definable by quantities that include the runlength of the preceding run of zero-valued coefficients, and the runlength of the cluster; and wherein the encoding of the position events includes jointly encoding the runlengths of the preceding run and of the cluster, such that for at least some position events, relatively more likely-to-occur pairs of runlengths are encoded by a shorter codeword than relatively less likely-to-occur runlengths.

15. A method as recited in claim 14, wherein the identifying of each position events identifies a run of consecutive zero-valued coefficients preceding a cluster of one or more consecutive non-zero-valued coefficients followed by a single non-zero valued coefficient, or identifies that there are no zero-valued coefficients preceding a cluster of one or more consecutive non-zero-valued coefficients followed by a single non-zero valued coefficient.

16. A method as recited in claim 14, wherein the jointly encoding of the runlengths uses a two-dimensional coding table.

17. A method as recited in claim 2, wherein the identifying of each position events includes identifying a run of consecutive zero-valued coefficients preceding a cluster of one or more consecutive non-zero-valued coefficients, or identifying that there are no zero-valued coefficients preceding a cluster of one or more consecutive non-zero-valued coefficients, such that each position event is definable by quantities that include the runlength of the preceding run of zero-valued coefficients, and the runlength of the cluster; and wherein the encoding of the relative positions includes:

encoding the runlengths of clusters of non-zero-valued coefficients using a first runlength coding method, and encoding the runlengths of runs of zero-valued coefficients that precede the clusters using a second runlength coding method, such that for at least some amplitude events, relatively more likely-to-occur pairs of runlengths are encoded by a shorter codeword than relatively less likely-to-occur runlengths.

18. A method as recited in claim 17, wherein the identifying of each position events identifies a run of consecutive zero-valued coefficients preceding a cluster of one or more consecutive non-zero-valued coefficients followed by a single non-zero valued coefficient, or identifies that there are no zero-valued coefficients preceding a cluster of one or more consecutive non-zero-valued coefficients followed by a single non-zero valued coefficient.

19. A method as recited in claim 2, further comprising:

providing a breakpoint to define the first contiguous region along the ordering of the series followed by a second contiguous region; such that the coefficients of the first contiguous region are encoded by a first region encoding method that includes the identifying of position events, the encoding of the position events, and the encoding of amplitudes according of the first amplitude coding method; and encoding the coefficients in the second contiguous region using a second region encoding method, and wherein the first region encoding method and the second region encoding method are such that the encoding of at least some of the coefficients or runs of coefficients in the first contiguous region is different than the encoding of at least some of the coefficients or runs of coefficients in the second contiguous region.

20. A computer readable hardware storage medium having instructions coded thereon that when executed by one or more processors cause execution of a method of processing an ordered series of digital signals that each has an amplitude from a finite set of amplitudes consisting of the most likely-to-occur amplitude and at least one other amplitude, the at least one other amplitude including a next most likely-to-occur amplitude to the most likely-to-occur amplitude, the execution of the method being in order to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords, the method comprising:

for a first contiguous region in the series:

identifying position events that each include a cluster of at least one consecutive signal having any amplitude other than the most likely-to-occur amplitude, such that the position events define relative positions and runlengths of the clusters and of any intervening runs of consecutive coefficients having the most likely-to-occur value;

encoding the position events; and encoding the amplitudes of the consecutive coefficients in one or more concatenations of a plurality of consecutive clusters to form at least one codeword for each concatenation, the encoding of amplitudes including using a first amplitude coding method that exploits that runs of consecutive signals having the next most likely-to-occur amplitude are more likely to occur in clusters than are runs of other signal amplitudes, such that for at least some of the concatenations, relatively more likely-to-occur series of consecutive signal amplitudes are encoded by a shorter codeword than relatively less likely-to-occur series of consecutive signal amplitudes, such that relatively short codewords are formed to represent signal values or sequences of signal values that are relatively more likely-to-occur, and relatively long codewords are formed to represent signal values or sequences of signal values that are relatively less likely-to-occur.

21. A computer readable hardware storage medium as recited in claim 20, wherein the series of digital signals is a series of quantized coefficients of a transformed block of image data, formed by a transform such that the most likely-to-occur amplitude is 0, and the next most likely-to-occur amplitude is 1, such that the identifying of position events identifies events that include a cluster of one or more non-zero-valued coefficients, and such that the concatenations are of a plurality of consecutive clusters of non-zero-valued coefficients.

22. A computer readable hardware storage medium as recited in claim 21, wherein the transformed block of image data includes a DC term, and wherein the DC term is separately encoded, such that the series of digital signals is a set of non-DC quantized coefficients of a transformed block of image data.

23. A computer readable hardware storage medium as recited in claim 21, wherein the encoding of the amplitudes includes separately encoding the signs of the amplitudes.

24. A computer readable hardware storage medium as recited in claim 21, wherein the first amplitude coding method includes, for at least one concatenation:

recognizing one or more sequences in the concatenation that are each a run of at least one consecutive amplitude-1 coefficient that ends in a coefficient having an amplitude greater than 1, or in the case of a sequence at the end of a concatenation, that is a run of only consecutive amplitude-1 coefficients, each recognized sequence being defined by the length of the runlength of the consecutive amplitude-1 coefficients, and by the amplitude of the ending coefficient, and encoding each recognized sequence by a codeword, such that for at least some recognized sequences, relatively more likely-to-occur sequences are encoded by a codeword that is a shorter codeword than that for relatively less likely-to-occur sequences.

25. A computer readable hardware storage medium as recited in claim 24, wherein the encoding of the amplitudes uses an encoding table that provides a codeword for each pair of the runlength of the sequence of preceding amplitude-1 coefficients and the amplitude of the ending coefficient of amplitude greater than 1, and wherein the coding table is constructed by assigning a variable length code according to measured or assumed statistics of pairs of the runlength of the sequence of preceding amplitude-1 coefficients and the amplitude of the ending coefficient.

26. A computer readable hardware storage medium as recited in claim 21, wherein the identifying of each position events includes identifying a run of consecutive zero-valued coefficients preceding a cluster of one or more consecutive non-zero-valued coefficients, or identifying that there are no zero-valued coefficients preceding a cluster of one or more consecutive non-zero-valued coefficients, such that each position event is definable by quantities that include the runlength of the preceding run of zero-valued coefficients, and the runlength of the cluster; and wherein the encoding of the position events includes jointly encoding the runlengths of the preceding run and of the cluster, such that for at least some position events, relatively more likely-to-occur pairs of runlengths are encoded by a shorter codeword than relatively less likely-to-occur runlengths.

27. A computer readable hardware storage medium as recited in claim 21, wherein the method further comprises:

providing a breakpoint to define the first contiguous region along the ordering of the series followed by a second contiguous region; such that the coefficients of the first contiguous region are encoded by a first encoding method that includes the identifying of position events, the encoding of the position events, and the encoding of amplitudes according of the first amplitude coding method; and encoding the coefficients in the second contiguous region using a second contiguous region encoding method, and wherein the first contiguous region encoding method and the second contiguous region encoding method are such that the encoding of at least some of the coefficients or runs of coefficients in the first contiguous region is different than the encoding of at least some of the coefficients or runs of coefficients in the second contiguous region.

28. An apparatus for processing an ordered series of digital signals that each has an amplitude from a finite set of amplitudes consisting of the most likely-to-occur amplitude and at least one other amplitude, the at least one other amplitude including a next most likely-to-occur amplitude to the most likely-to-occur amplitude, the processing by the apparatus being in order to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords, the apparatus comprising:

means for identifying, in a first contiguous region in the series, position events that each include a cluster of at least one consecutive signal having any amplitude other than the most likely-to-occur amplitude, such that the position events define relative positions and runlengths of the clusters and of any intervening runs of consecutive coefficients having the most likely-to-occur value;

means for encoding the position events in the first contiguous region; and means for encoding the amplitudes of the consecutive coefficients in one or more concatenations of a plurality of consecutive clusters to form at least one codeword for each concatenation, the means for encoding of amplitudes including using a first amplitude coding method that exploits that runs of consecutive signals having the next most likely-to-occur amplitude are more likely to occur in clusters than are runs of other signal amplitudes, such that for at least some of the concatenations, relatively more likely-to-occur series of consecutive signal amplitudes are encoded by a shorter codeword than relatively less likely-to-occur series of consecutive signal amplitudes, such that relatively short codewords are formed to represent signal values or sequences of signal values that are relatively more likely-to-occur, and relatively long codewords are formed to represent signal values or sequences of signal values that are relatively less likely-to-occur.

29. An apparatus as recited in claim 28, wherein the series of digital signals is a series of quantized coefficients of a transformed block of image data, formed by a transform such that the most likely-to-occur amplitude is 0, and the next most likely-to-occur amplitude is 1, such that the identifying of position events identifies events that include a cluster one or more non-zero-valued coefficients, and such that the concatenations are of a plurality of consecutive clusters of non-zero-valued coefficients.

30. An apparatus as recited in claim 29, wherein the transformed block of image data includes a DC term, and wherein the DC term is separately encoded, such that the series of digital signals is a set of non-DC quantized coefficients of a transformed block of image data.

31. An apparatus as recited in claim 29, wherein the encoding of the amplitudes includes separately encoding the signs of the amplitudes.

32. An apparatus as recited in claim 29, wherein the first amplitude coding method includes, for at least one concatenation:

recognizing one or more sequences in the concatenation that are each a run of at least one consecutive amplitude-1 coefficient that ends in a coefficient having an amplitude greater than 1, or in the case of a sequence at the end of a concatenation, that is a run of only consecutive amplitude-1 coefficients, each recognized sequence being defined by the length of the runlength of the consecutive amplitude-1 coefficients, and by the amplitude of the ending coefficient, and encoding each recognized sequence by a codeword, such that for at least some recognized sequences, relatively more likely-to-occur sequences are encoded by a codeword that is a shorter codeword than that for relatively less likely-to-occur sequences.

33. An apparatus as recited in claim 32, wherein the means for encoding of the amplitudes uses an encoding table that provides a codeword for each pair of the runlength of the sequence of preceding amplitude-1 coefficients and the amplitude of the ending coefficient of amplitude greater than 1, and wherein the coding table is constructed by assigning a variable length code according to measured or assumed statistics of pairs of the runlength of the sequence of preceding amplitude-1 coefficients and the amplitude of the ending coefficient.

34. An apparatus as recited in claim 29, wherein the means for identifying of each position events includes means for identifying a run of consecutive zero-valued coefficients preceding a cluster of one or more consecutive non-zero-valued coefficients, or for identifying that there are no zero-valued coefficients preceding a cluster of one or more consecutive non-zero-valued coefficients, such that each position event is definable by quantities that include the runlength of the preceding run of zero-valued coefficients, and the runlength of the cluster; and wherein the means for encoding of the position events includes means for jointly encoding the runlengths of the preceding run and of the cluster, such that for at least some position events, relatively more likely-to-occur pairs of runlengths are encoded by a shorter codeword than relatively less likely-to-occur runlengths.

35. An apparatus as recited in claim 29, further comprising:

means for providing a breakpoint to define the first contiguous region along the ordering of the series followed by a second contiguous region; such that the coefficients of the first contiguous region are encoded by a first encoding method that includes the identifying of position events, the encoding of the position events, and the encoding of amplitudes according of the first amplitude coding method; and means for encoding the coefficients in the second contiguous region using a second region encoding method, and wherein the first contiguous region encoding method and the second contiguous region encoding method are such that the encoding of at least some of the coefficients or runs of coefficients in the first contiguous region is different than the encoding of at least some of the coefficients or runs of coefficients in the second contiguous region.

36. An apparatus comprising a processing system including one or more processors and a memory, the processing system configured to accept an ordered series of digital signals that each have has an amplitude from a finite set of amplitudes consisting of the most likely-to-occur amplitude and at least one other amplitude, the processing system further configured to cause the apparatus to process the accepted ordered series of digital signals to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords, the processing system configured to cause the apparatus to:

for a first contiguous region in the series:

identify position events that each include a cluster of at least one consecutive signal having any amplitude other than the most likely-to-occur amplitude, such that the position events define relative positions and runlengths of the clusters and of any intervening runs of consecutive coefficients having the most likely-to-occur value;

encode the position events; and encode the amplitudes of the consecutive coefficients in one or more concatenations of a plurality of consecutive clusters to form at least one codeword for each concatenation, the encoding of amplitudes including using a first amplitude coding method that exploits that runs of consecutive signals having the next most likely-to-occur amplitude are more likely to occur in clusters than are runs of other signal amplitudes, such that for at least some of the concatenations, relatively more likely-to- occur series of consecutive signal amplitudes are encoded by a shorter codeword than relatively less likely-to-occur series of consecutive signal amplitudes, such that relatively short codewords are formed to represent signal values or sequences of signal values that are relatively more likely-to-occur, and relatively long codewords are formed to represent signal values or sequences of signal values that are relatively less likely-to-occur.

37. An apparatus as recited in claim 36, wherein the series of digital signals is a series of quantized coefficients of a transformed block of image data, formed by a transform such that the most likely-to-occur amplitude is 0, and the next most likely-to-occur amplitude is 1, such that the identifying of position events identifies events that include a cluster one or more non-zero-valued coefficients, and such that the concatenations are of a plurality of consecutive clusters of non-zero-valued coefficients.

* * * * *

UNITED STATES PATENT AND TRADEMARK OFFICE

CERTIFICATE OF CORRECTION

PATENT NO. : 7,620,258 B2
APPLICATION NO. : 11/270138
DATED : November 17, 2009
INVENTOR(S) : Chen et al.

It is certified that error appears in the above-identified patent and that said Letters Patent is hereby corrected as shown below:

In column 22, line 37, kindly replace "senes" with --series--

Signed and Sealed this

Eleventh Day of May, 2010

David J. Kappos
*Director of the United States Patent and Trademark Office*

UNITED STATES PATENT AND TRADEMARK OFFICE

CERTIFICATE OF CORRECTION

PATENT NO. : 7,620,258 B2
APPLICATION NO. : 11/270138
DATED : November 17, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Fourteenth Day of December, 2010

David J. Kappos
*Director of the United States Patent and Trademark Office*